Figure 1:
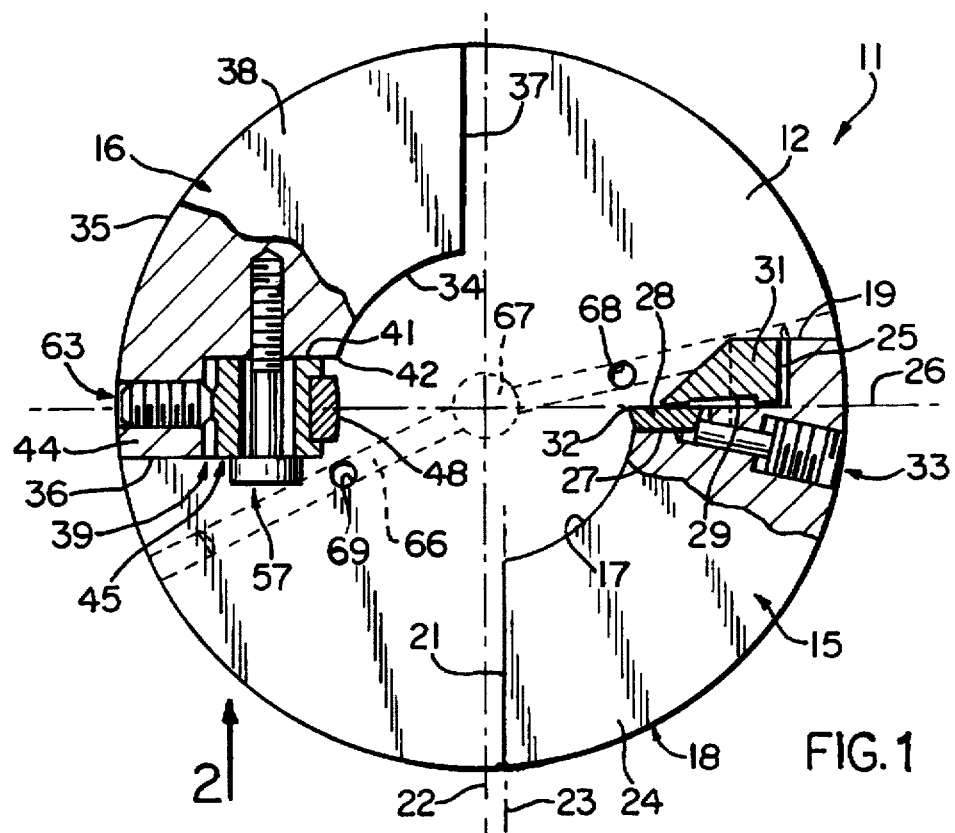

United States Patent [19]

Basteck

[11] Patent Number: 5,733,075
[45] Date of Patent: Mar. 31, 1998

[54] MACHINING DEVICE

[76] Inventor: Andreas Basteck, Ebinger Str. 115, D-72474 Winterlingen, Germany

[21] Appl. No.: 271,412

[22] Filed: Jul. 6, 1994

[51] Int. Cl.$^6$ .................................................. B23B 51/00
[52] U.S. Cl. ............................ 408/57; 408/199; 408/203.5
[58] Field of Search ................................ 408/79, 80, 81, 408/72 R, 57, 113, 114, 199, 203.5; 407/2, 4; 82/113

[56] References Cited

U.S. PATENT DOCUMENTS

| | | | |
|---|---|---|---|
| 2,491,538 | 12/1949 | Williamson et al. | 408/114 |
| 4,264,246 | 4/1981 | Lowis et al. | 408/81 |
| 4,691,600 | 9/1987 | Carlson et al. | 408/80 |

FOREIGN PATENT DOCUMENTS

| | | | |
|---|---|---|---|
| 72941 | 3/1983 | European Pat. Off. | 408/203.5 |
| 151384 | 8/1985 | European Pat. Off. | 408/203.5 |

Primary Examiner—Daniel W. Howell

[57] ABSTRACT

An external reamer has a cutting head (11) having two claws (15, 16) projecting parallel to the axis from a base (12). On one claw (15) is fastened a cutter plate (28), whose axially parallel cutting edge (32) is directed radially inwards in order accordingly to machine a cylindrical outer side of a workpiece. On the other claw (16) a guide strip (45) is detachably fastened by means of at east one clamp screw (57), so that its guide surface (48) lies, diametrically opposite the cutting edge, against the outer side of the workpiece and stabilizes the machining operation. This guide strip (45) is preferably capable of fine adjustment in the radial direction by means of a pressure screw (63). The detachability of the guidestrip (45) has the advantage that the surface of the guide face (48) can be produced without problems separately from the cutting head (11) and with any desired shape. In the same way a plurality of similar guide strips distributed around the circumference may also be provided.

24 Claims, 3 Drawing Sheets

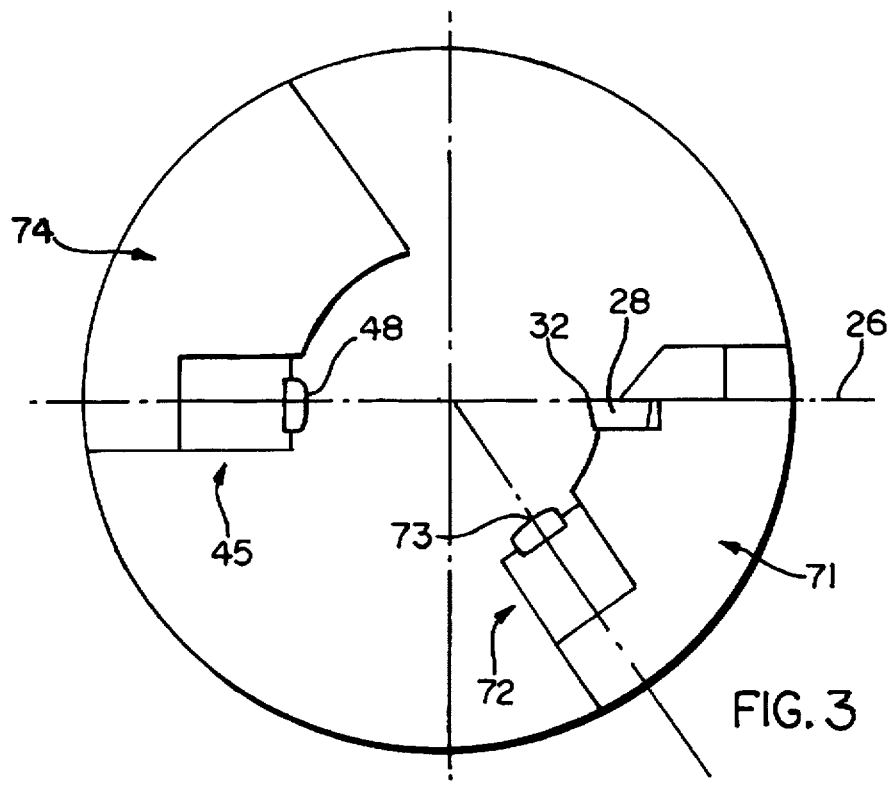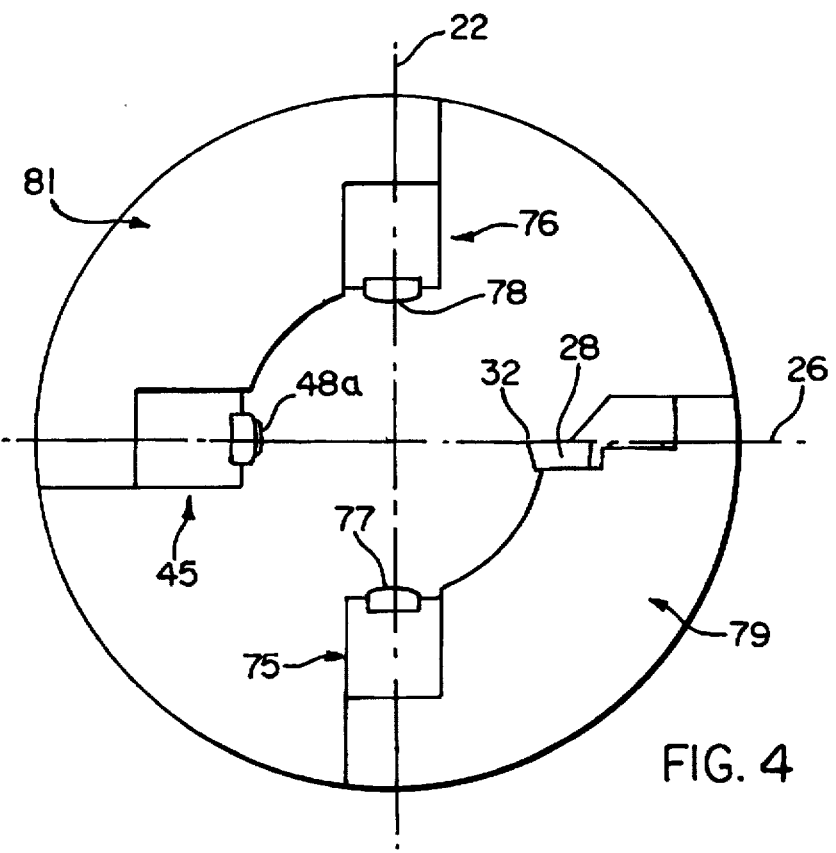

MACHINING DEVICE

The invention relates to a device according to the pre-characterizing clause of claim 1.

A device of this kind is known from DE 36 40 202 C2. The cutting head is in the form of a hollow cylinder having a sector-shaped cut-out in the region of the cutter plate. A sleeve of hard material, which likewise has a sector-shaped cut-out, is joined to the inner wall of the hollow cylinder. The inner surface of the sleeve is uniformly cylindrically coaxial to the geometrical longitudinal axis, which leads to undefined, random zones of contact with the outer side of the workpiece. In a development, a plurality of projections in the form of guide strips should be formed on the inner surface, in order thus to produce defined guide surfaces. However, such projections can be produced on the sleeve of hard material with the necessary accuracy only with great difficulty.

The object of the invention is to provide a device of the relevant generic type which can be produced with the required precision in a simple manner in respect of manufacturing technique, and which permits further advantages.

This aim is achieved by the characterizing features of claim 1.

The guide strip is a separable functional part, while here the grinding of the guide surface in the desired shape and with the desired precision can be effected without problems. In particular, there is no need to resort to more expensive internal profile grinding. In addition, uniform guide strips can be used with various cutting heads designed for different machining diameters. Just like the cutter plate, a worn or damaged guide strip can now also be replaced, so that the useful life of the cutting head is considerably lengthened.

According to the development in claim 2, the range of utilization can be extended by varying the machining diameter, and, if a plurality of guide strips are distributed over the circumference, the guiding of the workpiece can be made more accurate, and in particular adapted more effectively to surface quality, by variously adjusting their radial spacing.

The configuration according to claim 3 gives accurate fine adjustment. Since the radial sliding force acts at right angles to the clamping force, the guide strip can still be moved, with great accuracy, when the clamp screw has been tightened. As the clamping force can during this time already be acting at full strength, there is no need to operate the clamp screw after the fine adjustment; its operation would undoubtedly result in a slight change of position of the guide strip.

The clamp screw can at first be arranged in various ways. As is known from the fastening of adjustable cutter plates, the clamp screw can for example be immovably supported by its conical head against the guide strip. During radial movement the stem of the screw is then bent like a spring rod. However, there is a risk that the stem of the screw will be bent beyond its elasticity range and thus permanently deformed.

According to the development in claim 4 the guide strip is held only by friction between the support surface and the head of the clamp screw, and consequently also moves in relation to the clamp screw on radial adjustment. Since it need not be flexible, said screw can be made very strong, thus also allowing higher clamp forces to be exerted. The transverse bore ensures a displacement path of adequate length for the present purposes, and moreover limits said path in an expedient manner. Since the first and second side surfaces lie parallel to one another, their positions can be transposed. This means that if the guide strip should have become asymmetrical as the result of wear, it can be turned around.

The preferred configuration of the invention according to claim 5 provides through its openness better access to the clamp screws and facilitates the checking of the radial spacings of the cutting edge and the guide surface.

What is here stated with regard to a guide strip obviously also applies to further guide strips. The open claw shape simplifies the installation of additional guide strips, while here, depending on their number, the arrangements according to claims 6 to 8 combine advantageous guiding of the workpiece with a weight-saving construction.

Figure 2:
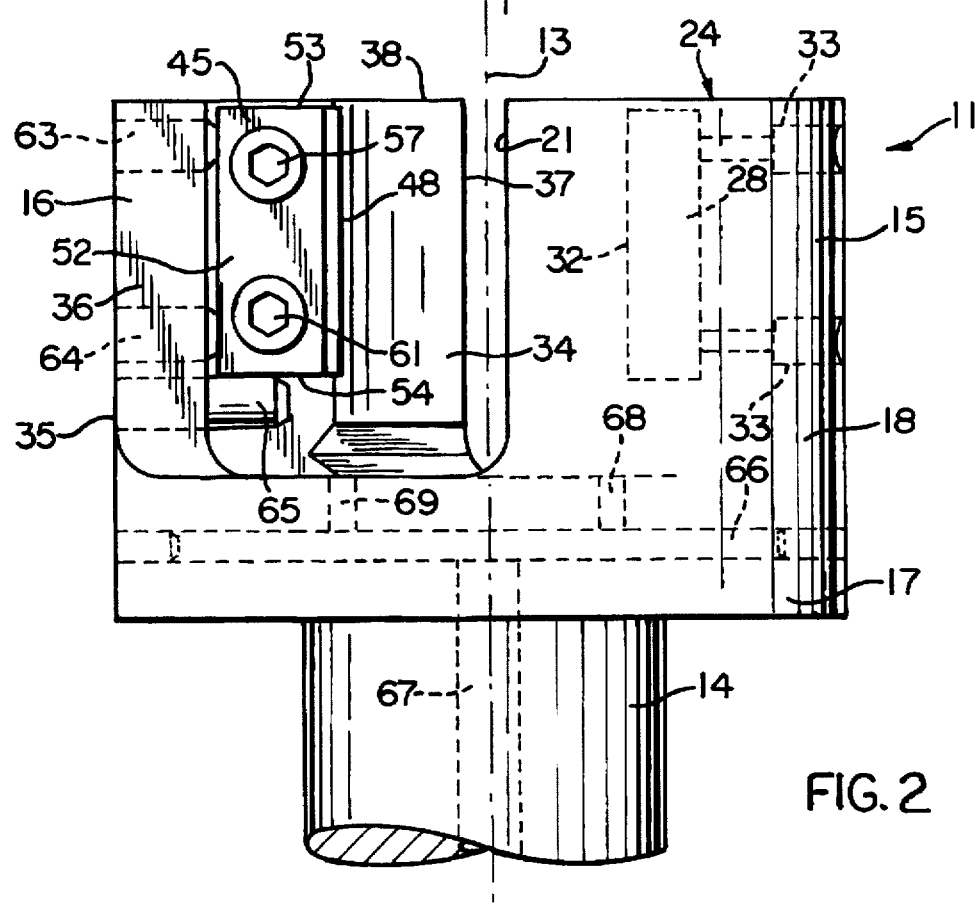
Figure 5:
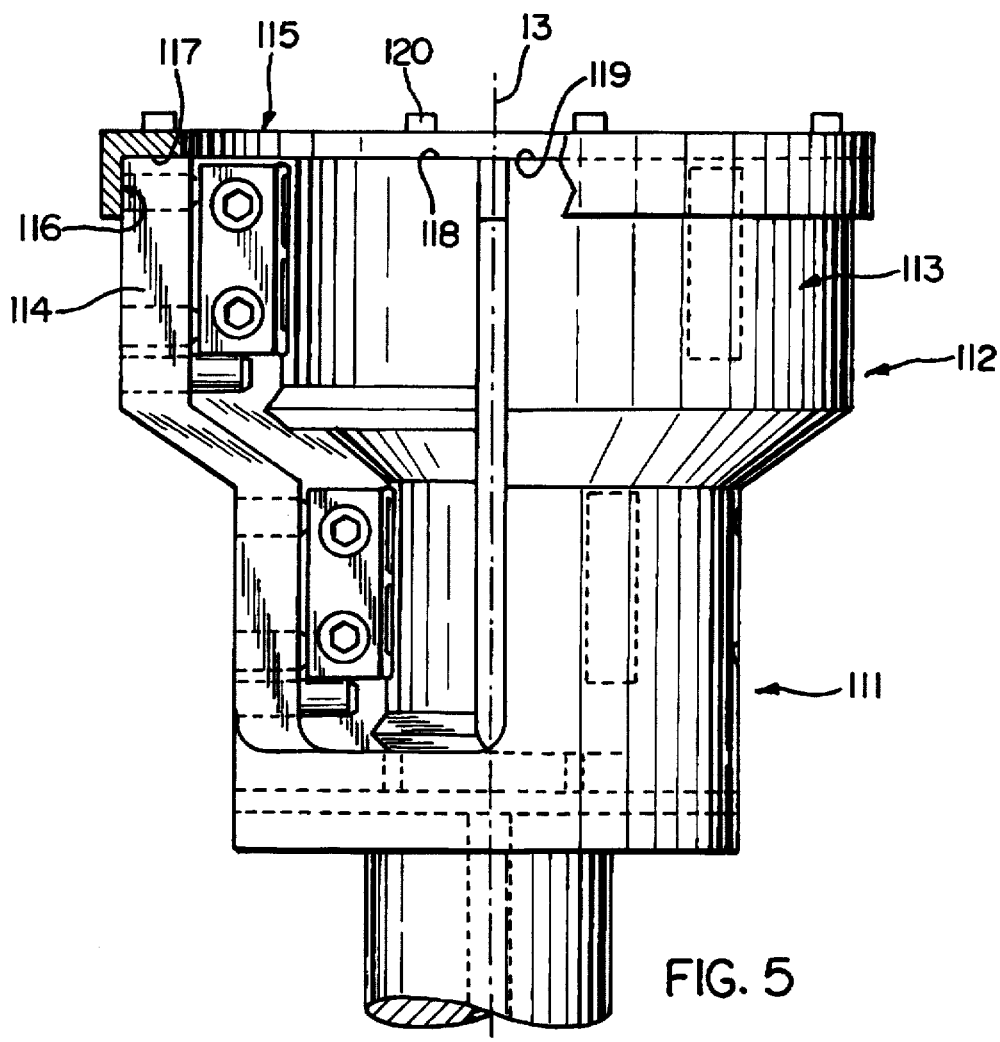
Figure 6:
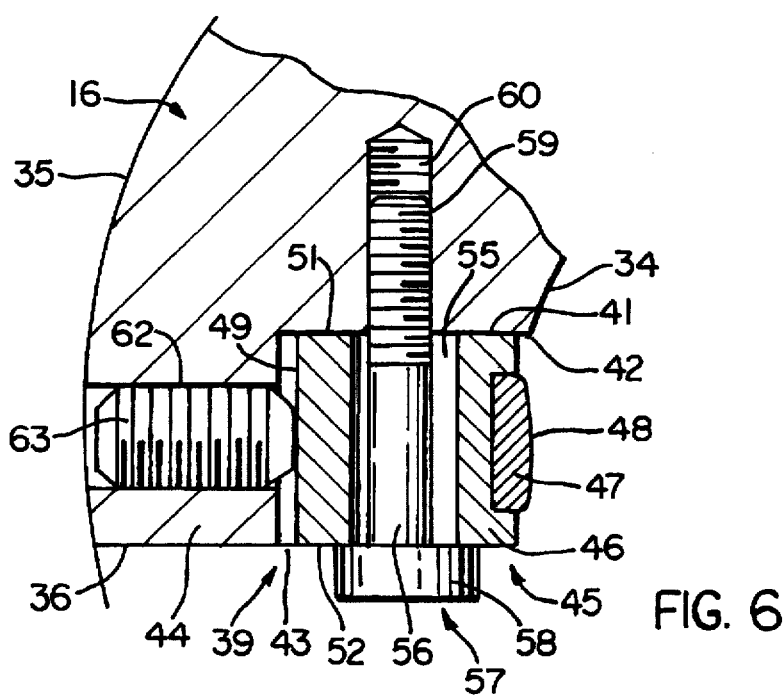

Further advantageous configurations and developments of the invention can be seen in the other subclaims and in the following description of exemplary embodiments illustrated in the drawing, in which:

FIG. 1 is a front view of a device according to a first configuration of the invention, FIG. 2 is a view of the device in the direction of the arrow 2 in FIG. 1, FIG. 3 is a schematically simplified illustration, corresponding to FIG. 1, of a second configuration of the invention, FIG. 4 is a schematically simplified illustration, corresponding to FIG. 1, of a third configuration of the invention, FIG. 5 is an illustration, corresponding to FIG. 2, of a fourth configuration of the invention, FIG. 6 shows a detail of FIG. 1 on a larger scale.

According to FIGS. 1 and 2, a cutting head 11 comprises a disc-shaped base 12, to which a geometrical longitudinal axis 13 is at right angles. The base 12 is preferably rotationally symmetrical thereto and formed on one end of a clamping shank 14 coaxial to the geometrical longitudinal axis 13. Two claws 15, 16 lying parallel and opposite one another and spaced radially apart project from the base 12 in the opposite axial direction to the clamping shank 14. In the view shown in FIG. 1, the first claw 15 has approximately the shape of part of a circular ring, comprising a cylindrical inner wall portion 17 pointing towards the geometrical longitudinal axis 13, an outer wall portion 18 coaxial to the geometrical longitudinal axis 13, a first longitudinal wall 19 and a second longitudinal wall 21. The circular ring part extends approximately over an angle sector of 90°. The longitudinal walls 19, 21 are directed sagitally.

In this respect the following definition applies. By sagittal plane is understood any plane which extends parallel to a centre plane. By centre plane is understood any plane which has all points in common with the geometrical longitudinal axis 13. Thus, the plane designated 22 in FIG. 1 is a centre plane, in relation to which the plane designated 23 constitutes a sagittal plane.

The first claw ends in a plane end face 24 directed perpendicularly to the geometrical longitudinal axis 13. In the first edge region between the inner wall portion 17 and the first longitudinal wall 19 a groove 25 having two steps is formed, whereby a support surface 27, directed sagitally to a centre plane 26, for a cutter plate 28 and a support surface 29 for a clamp claw 31 are formed. The clamp claw 31 is clamped against the cutter plate 28 by means of a clamp screw in a manner known per se and not especially illustrated here. The contour of the cutter plate 28 is indicated in FIG. 2 in order to illustrate its axial extent and position. Its cutting edge 32 extends at a first radial distance from and parallel to the geometrical longitudinal axis 13, but may also be slightly inclined. The upper side of the cutter plate 28 here lies at least approximately in the centre plane 26. A pressure screw arrangement 33 is also illustrated, which serves for the fine adjustment of the radial position of the cutting edge 32. The inner wall portion 17 has a second radial distance from the geometrical longitudinal axis 13, which is slightly greater than the first radial distance from the cutting edge 32.

The second claw 16 likewise has in the view shown in FIG. 1 the shape of part of a circular ring, comprising a cylindrical inner wall portion 34 pointing towards the geometrical longitudinal axis 13, an outer wall portion 35 coaxial to the geometrical longitudinal axis 13, a first longitudinal wall 36 and a second longitudinal wall 37. The longitudinal walls 19, 21 are directed sagittally. The second claw 16 ends in a plane end face 38, which is directed perpendicularly to the geometrical longitudinal axis 13 and which is in alignment with the end face 24 of the first claw 15. In the first edge region between the inner wall portion 34 and the first longitudinal wall 36, which region is shown on a larger scale in FIG. 6, a vee groove 39 is formed, whereby a sagittally directed plane support surface 41 is formed. The axially extending inner edge 42 at the transition to the inner wall portion 34 is, like the entire inner wall portion 34, at approximately the same second radial distance from the geometrical longitudinal axis 13 as the inner wall portion 17. As the result of the vee groove 39, a wall region 43 is formed, which is not necessarily directed at right angles to the support surface 41 and behind which a supporting wall 44 remains.

Embedded in this vee groove 39 is a guide strip 45 which is in the form of a tetrahedral prism and which in this example consists of a strip base body 46 of normal steel with a strip-shaped hard metal insert 47 inseparably attached to it on one longitudinal side. In the example the free surface of the hard metal insert 47 is convexly ground as part of a cylinder surface and forms a guide surface 48 at the point of contact with a Workpiece (not shown here). Opposite this guide surface 48 the strip base body 46 has a bottom surface 49. The strip base body 46 and thus also the guide strip 45 have in addition a first plane side surface 51 directed approximately at right angles to the guide surface 48, and a second plane side surface 52 lying opposite and parallel thereto, as well as two end faces 53, 54. In the strip base body 46 a transverse bore 55 is formed, leading out at right angles to the first and second side surfaces 51, 52. The shank 56 of a clamp screw 57 passes with clearance through this transverse bore 55, the flat head 58 of the clamp screw 57 being supported and lying flat on the second side surface 52, while the threaded shank 59 of said screw is screwed into a threaded bore 60, which leads out at right angles into the support surface 41. A second, similar clamp screw 61, axially offset, is preferably provided, as indicated in FIG. 2. The guide strip 45 can thus be reliably fastened firmly but detachably to the second claw 16, while the guide surface 48, lying approximately in the centre plane 26, lies diametrically opposite the cutting edge 32 relative to the geometrical longitudinal axis 13.

A threaded bore 62 extends through the supporting wall 44 and leads out into the wall region 43 and the outer wall portion 35. A pressure screw 63 is screwed into the threaded bore 62, its radially inner end face being able to be pressed directly, or with the interposition of a pressure body, against the bottom surface 49. A second, similar pressure screw 64, axially offset, is preferably provided, as illustrated in FIG. 2. The guide strip 45 can thus be very accurately adjusted radially. In the axial direction the position of the guide strip is defined by a stop pin 65, against which the end face 54 bears.

Because the claws 15, 16 extend in each case only over a limited angle sector, the cutting head 11 has an openness such that the guide strip 45 can be conveniently inserted or replaced. The two clamp screws 57, 61 hold the guide strip fast in a reliable manner, and accurate adjustment is ensured by the pressure screws 63, 64, which are accessible from a radially outside position, the openness also facilitating verification of dimensions. Adjustment work is also assisted by the fact that the inner wall portion 34, or also the inner wall portion 37, is or are ground (sized) with exact radial spacing. These surfaces can then be employed as reference surfaces.

A workplace is machined in two ways. The workpiece can rotate while the cutting head 11 is held stationary and, makes only the axial feed movement. Or conversely, the workpiece is held stationary while the cutting head 11 rotates. In this case the geometrical longitudinal axis 13 is at the same time the axis of rotation. With this type of operation, considerable centrifugal forces occur if speeds of rotation of up to approximately 7000 revolutions per minute are used. It is then advantageous for the two claws 15, 16, with all the parts fastened to them, to have the same weight and to be balanced.

Coolant channels 66 are provided in the cutting head 11 and are in communication with a supply line 67 in the clamping shank 14, leading out via axially parallel bores 68, 69 in the base 12 at points such that the jets of liquid reach not only the cutting edge 32 but also the guide surface 48. Taking into account the relative rotation between the cutting head 11 and the workpiece, the bores 68, 69 are arranged with a slight lead. The supply of coolant to the guide surface 48 assists the formation of a liquid cushion, thus reducing wear.

Instead of attaching a hard metal insert 47 to the strip base body 46, a thin hard, solid coating (48a) (See FIG. 4) may also simply be applied. The surface may have a convex shape, as shown in the drawings, thus giving rise to a narrow zone of contact with the workplace surface. A larger zone of contact is obtained with a concave surface configuration. The dynamic conditions for the guiding are correspondingly different. Since the guide strip can be separated from the cutting head, any desired surfaces can be produced without problems.

According to FIG. 3, in addition to the cutter plate 28 a second guide strip 72 is attached to the first claw 71, in such a manner that its guide surface 73 is arranged to trail by approximately 50 to 60 degrees, particularly 55 degrees, relative to the cutting edge 32. Since the mounting in a vee groove has a similar configuration to that in the case of the first guide strip 25, the angle sector over which the claw 71 extends is shortened accordingly. For reasons of weight balance, the second claw 74 is likewise shortened relative to the previous example. They extend over an arc length of 50 to 90 degrees, particularly 80 degrees.

According to FIG. 4, a total of three guide stripe 45, 75, 76 are provided in an arrangement such that the three guide surfaces 77, 48, and 78 are offset relative to one another by approximately 90 degrees in each case. Because of their mounting in a vee groove open at the edge, the claws 79, 81 here extend over an arc length of about 100 to 120 degrees, in particular 110 degrees.

According to FIG. 5, two cutting heads 111 and 112 are, so to speak, provided axially in succession, the cutting head 111 corresponding substantially to the cutting head 11 in FIGS. 1 and 2. A similar extension of larger diameter simply adjoins its end face. In accordance with this arrangement a third cutting head can also be attached in a manner not illustrated. Since here the claws 113, 114 are given a correspondingly larger axial projecting length, it is here advisable to fit over the end regions of the claws a one-piece holding ring 115, which has an inner cylindrical fitting surface 116, coaxial to the geometrical longitudinal axis, lying with a tight fit but detachably against the cylindrical outer wall portions and preventing, after the style of a barrel hoop, the opening-out of the claws. In this way the claws do not have to be given dimensions which make them difficult to handle. The holding ring 115 preferably has an L-shaped cross-section, so that an annular surface 117 directed perpendicularly to the geometrical longitudinal axis 13 and lying against the free end faces 118, 119 of the claws 113, 114 lies in front of the fitting surface 116 and is for example fixed by screws 120 distributed over the circumference. It is obvious that a holding ring of this kind can also be provided on the single-stage cutting head 11 shown in FIG. 2.

I claim:

1. Device for machining an outer side, coaxial to a geometric longitudinal axis, of a workpiece, comprising a cutting head which can be fitted axially over the outer side of the workpiece, a cutter plate which can be attached to the cutting head and whose cutting edge extends parallel to and at a first predeterminable radial distance from the geometrical longitudinal axis, and comprising at least one guide surface which is arranged on the cutting head and which can be slidingly applied against a portion of the outer side of the workpiece, characterized in that the guide surface (48) is formed on a guide strip (45), further comprising means to detachably attach the guide strip to the cutting head (11).

2. Device according to claim 1, characterized in that the guide strip (45) is mounted on the cutting head (11), further comprising means for adjusting the guide strip radially relative to the geometrical longitudinal axis (13).

3. Device according to claim 2, characterized in that the cutting head (11) has a plane support surface (41) which lies in a sagittal plane relative to the geometrical longitudinal axis (13), the radially inner edge (42) of the support surface (41) being arranged at a second predetermined radial distance which is greater than the first radial distance, in that the cutting head (11) has a supporting wall (44) which is directed approximately at right angles to the support surface (41) and adjoins the radially outer edge of the latter, in that the guide strip (45) has a plane first side surface (51) directed approximately at right angles to the guide surface (48) and a bottom surface (49) lying opposite the guide surface (48), in that the first side surface (51) of the guide strip (45) can be pressed firmly against the support surface (41) by means of at least one clamp screw (57) which is supported on the cutting head (11) and on the guide strip (45), and in that in the supporting wall (44) of the cutting head (11) at least one pressure screw (63) is provided, which can be screwed in approximately radially and whose radially inner end face can be pressed at least indirectly against the bottom surface (49) of the guide strip (45), while the guide strip (45) can be displaced relative to the cutting head (11) in a range of tenths of a millimeter by means of the pressure screw (63) while the clamp screw (57) is clamped fast.

4. Device according to claim 3, characterized in that in the cutting head (11) a threaded bore (60) leading out at right angles into the support surface (41) is provided for the threaded shank (59) of the clamp screw (57), in that the guide strap (45) has a plane second, side surface (52) lying parallel to and opposite the first side surface (51) and also has a transverse bore (55) which leads out at right angles to the first and second side surfaces and which receives with clearance the shank (56) of the clamp screw (57), the head (58) of the clamp screw (57) being supported and resting on the second side surface (52).

5. Device according to claim 1, characterized in that the cutting head (11) is formed by two claws (15, 16) which lie opposite and at a radial distance from one another in relation to the geometrical longitudinal axis (13) and which project in an axial direction, parallel to one another, from a common disc-shaped base (12), which claws (15, 16), viewed in the axial direction, each have approximately roughly the shape of parts of a portion of a circular ring, comprising a cylindrical inner wall portion (17, 34) pointing towards the geometrical longitudinal axis (13), a cylindrical outer wall portion (18, 35) coaxial to the geometrical longitudinal axis (13), and two, first and second longitudinal walls (19, 21, 36, 37) which are each distant from one another by the length of the arc of the circular ring portion and which are directed sagittally, while in the first edge region between the inner wall portion (17) and the first longitudinal wall (19) of the first claw (15) the cutter plate (28) is arranged, and in the first edge region between the inner wall portion (34) and the first longitudinal wall (36) of the second claw (16) a first guide strip (45) can be attached, in such a manner that the cutting edge (32) and the guide surface (48) lie at least approximately diametrically opposite one another in relation to the geometrical longitudinal axis (13).

6. Device according to claim 5, characterized in that in the second edge region between the inner wall portion and the second longitudinal wall of the first claw (71) a second guide strip (72) is attachable in such a manner that its guide surface (73) is arranged to trail by approximately 50 to 60 degrees, relative to the cutting edge (32).

7. Device according to claim 6, characterized in that the two claws (71, 74) each extend over an arc length of approximately 50 to 90 degrees.

8. Device according to claim 5, characterized in that in the second edge region between the inner wall portion and the second longitudinal wall of the first claw (79) a second guide strip (75) is attachable, and in that in the second edge region between the inner wall portion and the second longitudinal wall of the second claw (81) a third guide strip (76) is attachable, the two claws (79, 81) each extending over an arc length of approximately 100 to 120 degrees, and the three guide surfaces (77, 48, 78) being offset by approximately 90 degrees in relation to one another.

9. Device according to claim 3 or one of claims 5 to 8, characterized in that the guide strip (45) is in each case fitted in the circular ring shape, while in the respective edge region between the inner wall portion (34) and the longitudinal wall (19) a vee groove (39) is formed, the first wall region of which forms the support surface (41) and the second wall region (43) of which delimits a supporting wall (44).

10. Device according to claim 5, characterized in that the cylindrical inner wall portion (34) of at least the second claw (16) is in the form of a reference surface which is accurately machined, particularly ground, with sized radial spacing from the geometrical longitudinal axis (13).

11. Device according to claim 5, characterized in that from the base (12) a clamping shank (14) coaxial to the geometrical longitudinal axis (13) projects in the axial direction opposite to the claws (15, 16).

12. Device according to claim 5, characterized in that a one-piece holding ring (115) is fitted over the two claws (113, 114) with a cylindrical inner fitting surface (116), which is coaxial to the geometrical longitudinal axis (13), lying with a tight fit against the cylindrical outer wall portions.

13. Device according to claim 12, characterized in that the holding ring (115) has an L-shaped cross-section, so that an annular surface (117) directed perpendicularly to the geometrical fitting surface (116) lies in front of the cylindrical fitting surface (116) and can be applied against the free end faces (118, 119) of the claws (113, 114).

14. Device according to claim 1, characterized in that the guide surface (48) is in the form of a portion of a cylinder surface whose center axis is directed parallel to the geometrical longitudinal axis (13).

15. Device according to claim 14, characterized in that the axial length of the guide surface (48) corresponds approximately to the length of the cutting edge (32) of the cutter plate (28).

16. Device according to claim 14, characterized in that the guide surface (48) is in the form of a portion of a convex cylinder surface.

17. Device according to claim 1 characterized in that the guide surface is formed by a guide strip region coated with a hard, solid coating.

18. Device according to claim 1, characterized in that the guide strip (45) consists of a strip base body (46) and of a hard metal insert (47) which is inseparably attached to it and which has the guide surface (48).

19. Device according to claim 1, characterized in that in the cutting head (11) coolant channels (66, 67, 68, 69) are formed, through which coolant can be passed both to the region of the cutter plate (28) and to the region of the guide surface (48).

20. Device according to claim 5 or 19, characterized in that the coolant channels lead out into the disc-shaped base in the form of axially parallel bores (68, 69), said bores each being arranged with a lead of a predetermined angle in relation to the position of the cutting edge (32) or guide surface (48) respectively.

21. Device according to one of claims 5 to 8, characterized in that the two claws (15, 16, 71, 74, 79, 81, 113, 114), including the cutter plate or guide strip or guide strips fastened to them, are at least approximately equal in respect of weight and have a configuration symmetrically balanced in relation to the geometrical longitudinal axis (13).

22. Device according to claim 6, characterized in that the guide surface (73) of the second guide strip (72) is arranged to trail by 55 degrees relative to the cutting edge (32).

23. Device according to claim 7, characterized in that the two claws (71, 74) each extend over an arc length of 80 degrees.

24. Device according to claim 8, characterized in that the two claws (79, 81) each extend over an arc length of 110 degrees.

* * * * *